United States Patent

[11] 3,602,326

[72] Inventor Robert A. Garrison
 Newport Beach, Calif.
[21] Appl. No. 852,417
[22] Filed Aug. 22, 1969
[45] Patented Aug. 31, 1971
[73] Assignee Garrison Manufacturing Co. Inc.
 Santa Ana, Calif.

[54] DUAL POWER STEERING SYSTEM
 11 Claims, 7 Drawing Figs.
[52] U.S. Cl. .................................................. 180/79.2 R,
 60/52 S, 91/413
[51] Int. Cl. ................................................. B62d 5/08
[50] Field of Search ............................................ 180/79.2;
 60/52 S; 91/413

[56] References Cited
 UNITED STATES PATENTS
2,069,540 2/1937 Sanford ...................... 180/79.2
2,168,480 8/1939 Johnson ...................... 180/79.2 X
2,369,547 2/1945 Eaton ........................ 180/79.2
2,489,450 11/1949 Crookston ................... 91/413
2,616,264 11/1952 Grant et al. ................ 91/413 X
2,824,447 2/1958 Garrison ..................... 180/79.2
Re.23,867 9/1954 Garrison ..................... 180/79.2

Primary Examiner—Benjamin Hersh
Assistant Examiner—Leslie J. Paperner
Attorney—Harris, Kiech, Russell & Kern ABSTRACT: A dual, fluid operated, power steering system having two separate fluid operated steering motors connected to the steerable wheels of the vehicle, two separate steering valves respectively controlling the two steering motors, and two separate pumps respectively connected to and supplying fluid under pressure to the steering valves. The two steering valves respectively form parts of an elongated link one end of which is connected to the steerable wheels to move therewith. In some instances, the other end of the elongated link is anchored to the frame of the vehicle, and a portion of the elongated link constitutes a control motor comprising a control cylinder and a control piston. A manually operated fluid control system selectively delivers fluid under pressure to the control cylinder on opposite sides of the control piston to actuate the two steering valves simultaneously. In another instance, the other end of the elongated link is connected directly to a manually operated pitman arm which simultaneously operates both steering valves, one directly and the other through an elongated connection between the two steering valves.

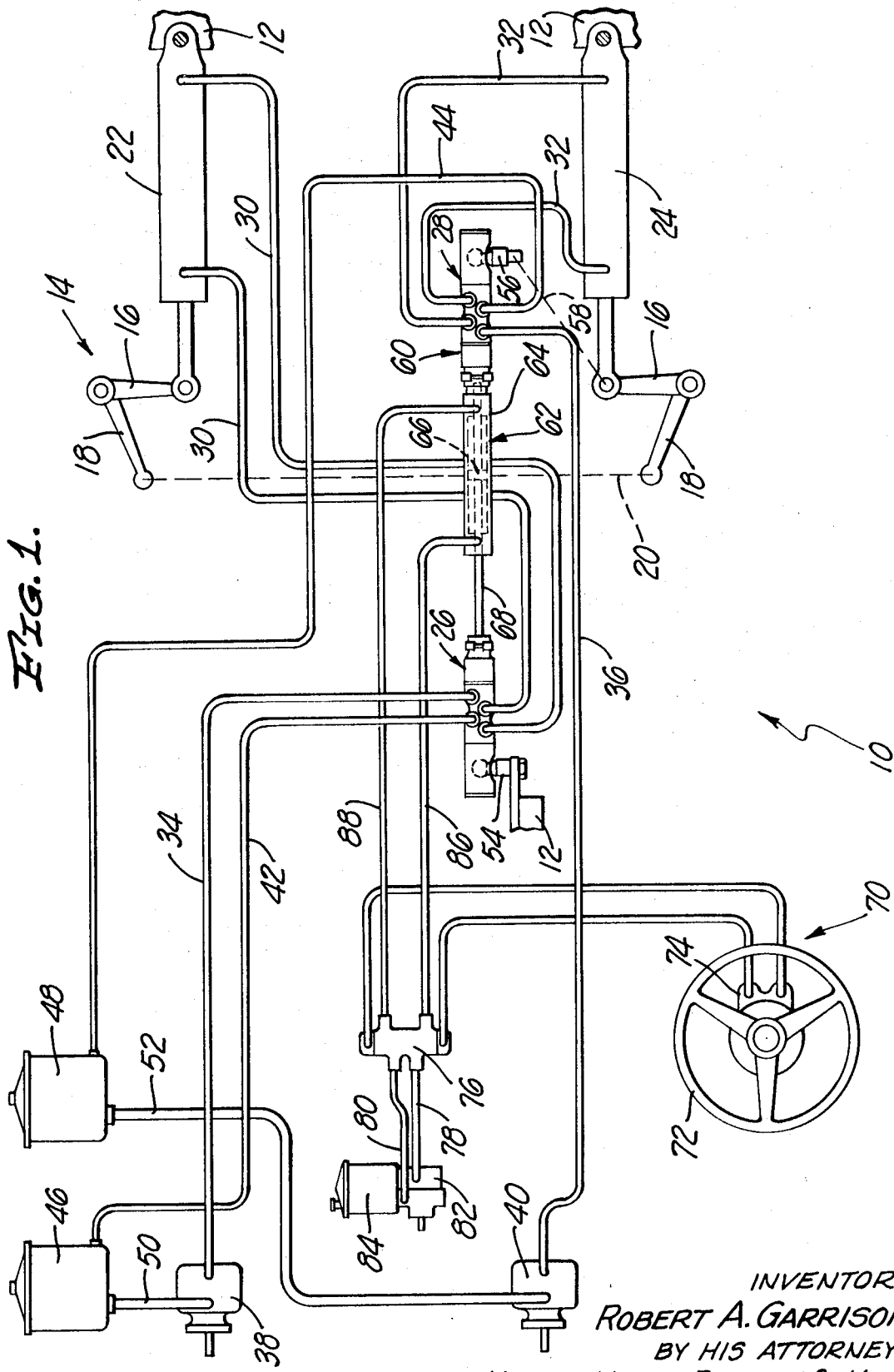

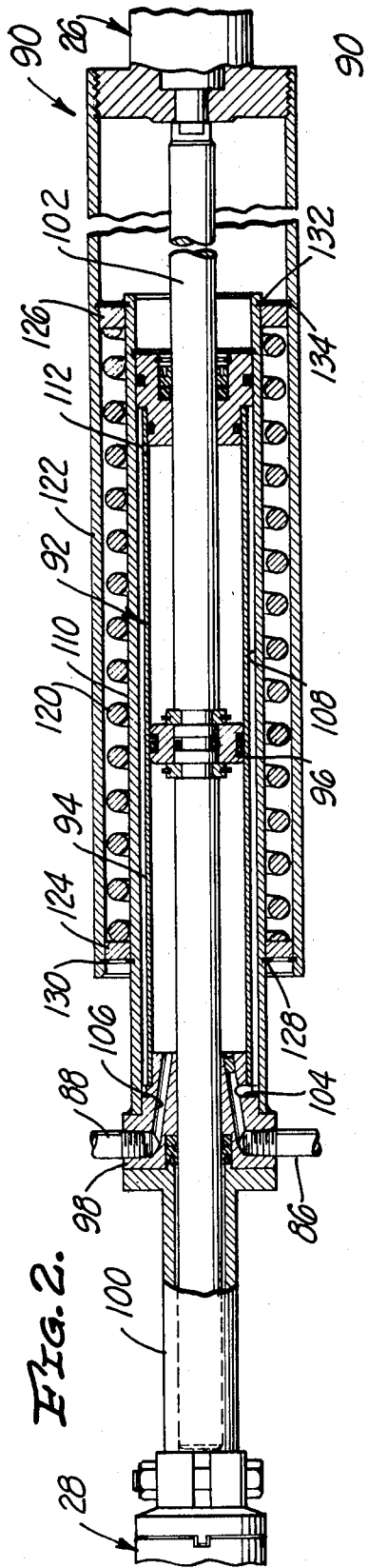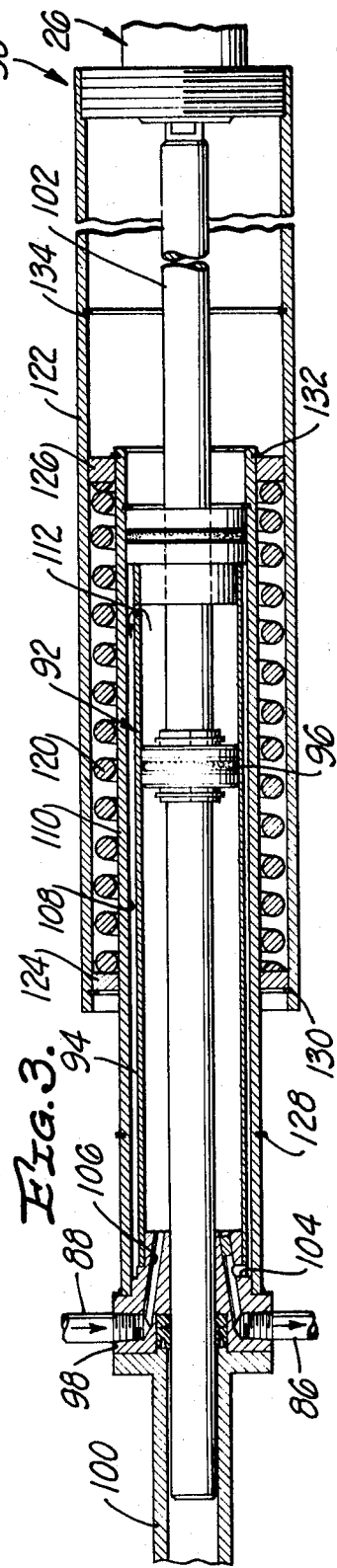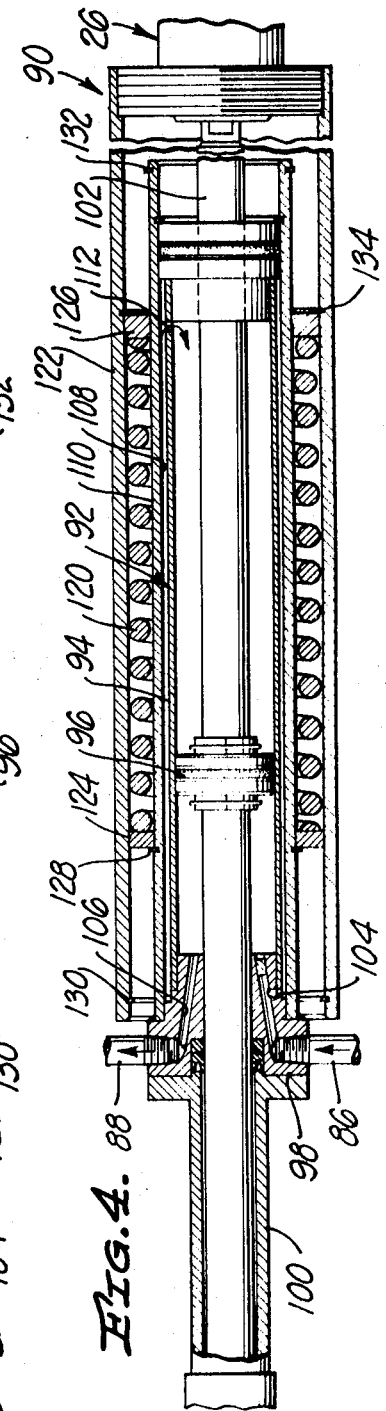

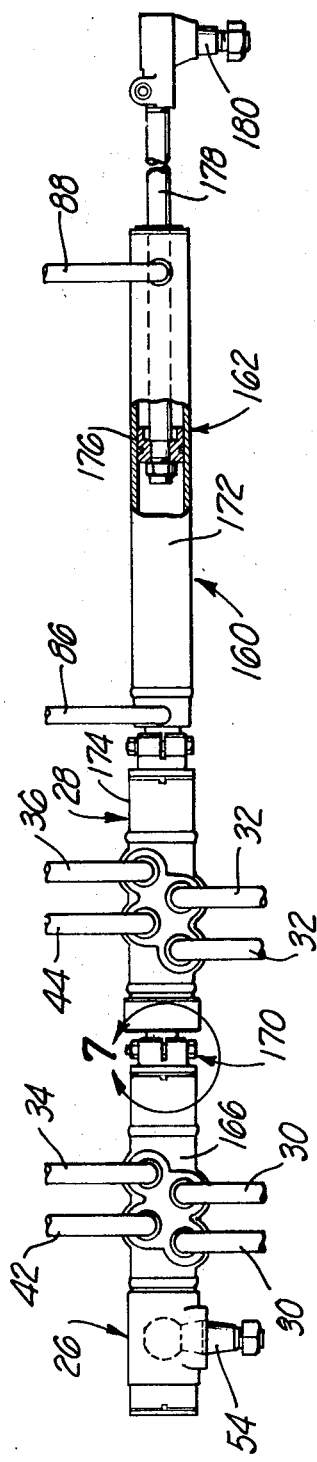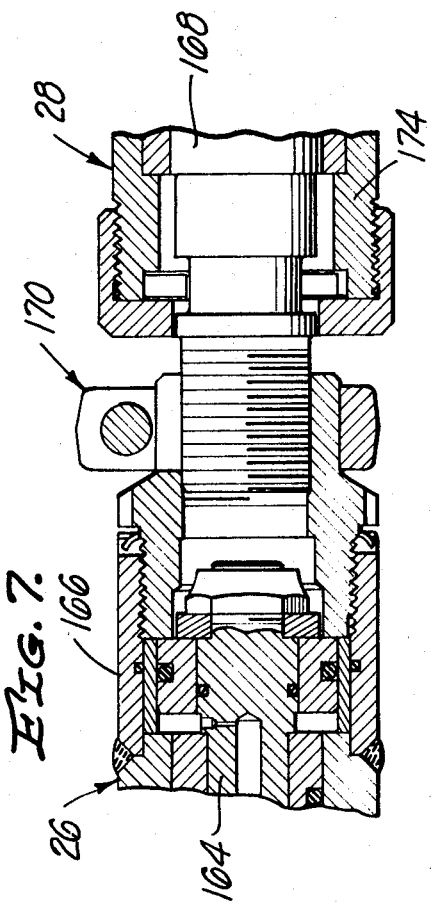

DUAL POWER STEERING SYSTEM

BACKGROUND OF THE INVENTION

The present invention relates in general to a power steering system and, more particularly, to a fluid operated No. generally similar to those disclosed in my U.S. Pat. No. Re. 23,867, reissued Sept. 14, 1954, and in my U.S. Pat. No. 2,824,447, issued Feb. 25, 1958. Each of these patents discloses a vehicle having some steerable means, such as steering arms or a steering linkage connected to steerable wheels, which is acted on by a fluid operated steering motor of the reciprocating type controlled by a steering valve having a reciprocable valve element of the spool type therein. In each instance, a manual steering input displaces the valve element of the steering valve on one direction or the other to cause the steering motor to displace the steerable means correspondingly. The steering valve disclosed in each of these patents includes a ball stud which engages the valve element and determines its position relative to the ports in the housing of the steering valve in response to a manual steering input force.

The fluid operated power steering system of each of the aforementioned patents also includes a steering pump which supplies fluid under pressure to the steering valve, the latter, in turn, delivering the fluid under pressure to one end or the other of the steering motor, or, in the absence of a steering input force, simply returning it to a reservoir connected to the steering pump inlet.

The present invention involves steering motors, steering valves and steering pump and reservoir assemblies identical in principle to those disclosed in my aforementioned patents. The latter are, therefore, incorporated herein by reference.

SUMMARY AND OBJECTS OF INVENTION

With the foregoing as background, the present invention relates more specifically to, and a primary object thereof is to provide, a dual, fluid operated, power steering system each half of which operates to steer the vehicle, in the manner hereinbefore set forth, independently of the other so that failure of one-half of the system for any reason will not incapacitate the entire steering system. Such a dual arrangement is of particular utility with heavy equipment, such as earth working or moving equipment, which cannot be steered manually in the event of complete power steering failure.

An important object of the invention is to provide a dual steering system wherein the two steering valves are aligned and form parts of an elongated steering-valve link.

Another object of the invention is to provide an elongated steering-valve link of the foregoing nature one end of which is connected to the steerable means of the vehicle to cause the steering-valve link to be responsive to the position of the steerable means at all times.

Still another important object of the invention is to provide manually operable steering means for actuating the two steering valves simultaneously to cause them to deliver fluid under pressure from the respective steering pumps to the respective steering motors simultaneously, in directions to cause both steering motors to displace the steerable means in the same direction.

A further object of the invention in connection with certain embodiments thereof is to connect the other end of the steering-valve link to the frame of the vehicle and to incorporate in the steering-valve link a fluid operated control motor comprising a control cylinder and a control piston, this control motor being connected to a manually operable control or steering means for delivering fluid under pressure to the control cylinder on opposite sides of the control piston selectively. With this construction, the two steering valves are caused to produce steering of the vehicle in one direction or the other, depending on which end of the control cylinder is pressurized by a manually operable steering means.

Another object in connection with the foregoing is to provide a manually operable control or steering means which includes a power operated control pump and a manually operable control valve for connecting the control pump to the control cylinder on opposite sides of the control piston selectively, the control valve being fluid operated and the manually operable control means including a manually operable pump means for operating the control valve.

An object in connection with another embodiment of the invention is to provide a steering-valve link wherein an elongated connection between the two steering valves is a simple rigid connection, and wherein the other end of the steering-valve link is mechanically connected to a manual control or steering means, e.g., is mechanically connected to a steering-wheel-operated pitman arm.

Yet another object is to provide a steering-valve link wherein the control motor incorporates spring means interconnecting the control cylinder and the control piston for biasing the control piston toward an intermediate, neutral position relative to the control cylinder, corresponding to straight line travel of the vehicle. Thus, with such a construction, whenever the manual steering input force is terminated, this spring means automatically restores the various components of the steering-valve link to positions corresponding to straight line vehicle travel, which is an important feature.

The foregoing objects, advantages, features and results of the present invention, together with various other objects, advantages, features and results thereof which will be evident to those skilled in the fluid operated power steering art in the light of this disclosure, may be achieved with the exemplary embodiments of the invention illustrated in the accompanying drawings and described in detail hereinafter.

DESCRIPTION OF DRAWINGS

FIG. 1 is a diagrammatic view of one embodiment of a dual, fluid operated, power steering system of the invention;

FIGS. 2, 3, and 4 are longitudinal sectional views showing a spring biased, fluid operated, control motor of a steering-valve link of the invention in different operating positions;

FIG. 6 is a fragmentary view similar to a portion of FIG. 1 and showing an alternative for the steering-valve link of FIG. 1; and FIG. 7 is an enlarged, fragmentary, longitudinal sectional view of the portion of FIG. 6 within the circle 7.

DESCRIPTION OF EXEMPLARY EMBODIMENT OF INVENTION, FIG. 1

Figure 5:
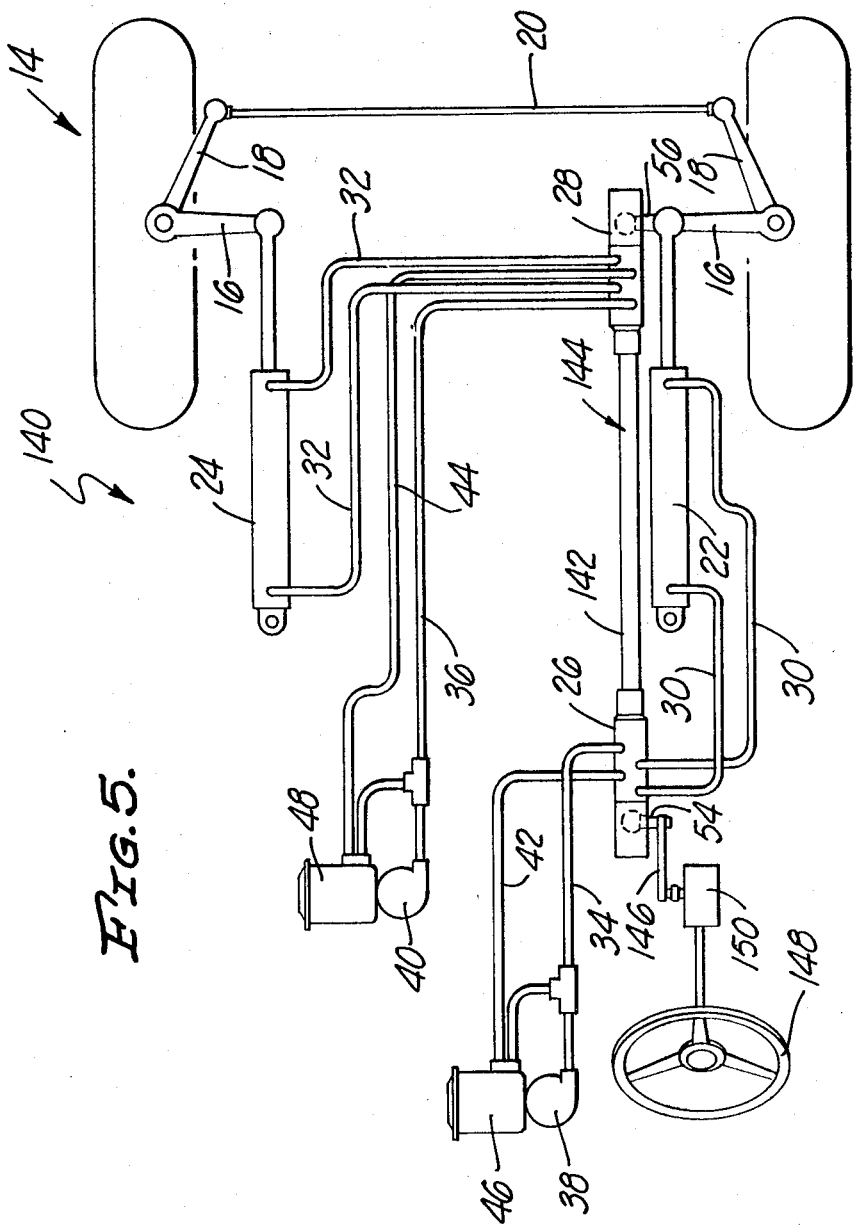
FIG. 5 is a semidiagrammatic view of another dual, fluid operated, power steering system of the invention.

This figure of the drawings shows a dual, fluid operated, power steering system 10 for a vehicle having a frame shown fragmentarily at 12 and having steerable means 14. The latter is shown for purposes of illustration as comprising two steering arms 16 having connected thereto arms 18 which, in turn, are suitably interconnected, as by a tie rod designated diagrammatically by the broken line 20. The steering arms 26, for example, be connected to steerable wheels, not shown.

The dual power steering system 10 includes separate, fluid operated, steering motors 22 and 24 of the reciprocating type each connected at one end to one of the steering arms 16 and at its other end to the frame 12. It will be understood that each steering motor 22 or 24 comprises a cylinder containing a piston, not shown.

The steering system 10 also includes two steering valves 26 and 28 of the type disclosed in the aforementioned patents, the steering valve 26 controlling the steering motor 22 through steering lines 30 and the steering valve 28 controlling the steering motor 24 through steering lines 32. Supply lines 34 and 36 deliver fluid under pressure to the steering valves 26 and 28 from independent, power-operated steering pumps 38 and 40. Return lines 42 and 44 respectively connect the steering valves 26 and 28 to reservoirs 46 and 48 which are connected, by lines 50 and 52, to the inlets of the pumps 38 and 40.

In the dual power steering system 10, the steering valves 26 and 28 are respectively connected to the frame 12 and the steerable means 14. More particularly, the ball stud 54 for actuating the steering valve 26 is connected to the frame 12 and the ball stud 56 for actuating the steering valve 28 is connected to the steerable means 14, so as to move therewith, as indicated diagrammatically by the dotted line connection 58.

The two steering valves 26 and 28 are disposed in aligned relation and form an elongated steering-valve link 60 in combination with a fluid operated control motor 62 interconnecting the two steering valves and disposed therebetween.

More particularly, the control motor 62 comprises a control cylinder 64 connected at one end to the adjacent end of the housing of the steering valve 28. Within the control cylinder 64 is a control piston 66 on a piston rod 68 the outer end of which is connected to the adjacent end of the housing of the steering valve 26.

The dual power steering system 10 includes manually operable control means 70 for delivering fluid under pressure to the control cylinder 64 on opposite sides of the control piston 66 selectively, depending on the direction in which it is desired to steer the vehicle. The control means 70 is shown as including a manually operable steering wheel 72 which drives a control pump 74 for selectively applying fluid pressure to opposite ends of a fluid operated control valve 76, depending on the direction in which the steering wheel is turned.

The control valve 76 has connected thereto supply and return lines 78 and 80 respectively leading from a power-operated pump 82 and leading to a reservoir 84, the latter being connected to the inlet of the pump. Control lines 86 and 88 extend from the control valve 76 to opposite ends of the control cylinder 64, and deliver fluid under pressure from the pump 82 to one end of the control cylinder 64 or the other, depending on which way the valve element within the control valve 76 is displaced by clockwise or counterclockwise rotation of the steering wheel 72.

Considering the operation of the dual power steering system 10, rotation of the steering wheel 72 in one direction or the other results in delivery of fluid under pressure to one end of the control cylinder 64 or the other, thereby either lengthening or shortening the steering-valve link 60 and concurrently developing in the link a longitudinal compression or tension force, respectively, which is applied to the steerable means 14 through the link. Any such variation in the length of this link results in simultaneous actuation of the steering valves 26 and 28 to correspondingly actuate simultaneously the steering motors 22 and 24 to cause them to act on the steerable means 14 simultaneously and in the same direction.

It will be understood that, with the foregoing construction, the steerable means 14 will remain in whatever position it is placed, until such time as the steering wheel 72 is again turned to change the position of the steerable means. It will be understood from the aforementioned patents that the steering valves 26 and 28 are open center valves when the steering wheel 72 is stationary. The same is true of the control valve 76.

DESCRIPTION OF EXEMPLARY EMBODIMENT OF INVENTION, FIGS. 2 TO 4

Illustrated in these figures of the drawings is a steering-valve link 90 which is similar to the steering-valve link 60 in that it includes a fluid operated control motor 92 aligned with and interconnecting the steering valves 26 and 28. The control motor 92 includes a control cylinder 94 containing a control piston 96, the cylinder having at one end a head 98 which is connected to the steering valve 28 through a quill 100. The control piston 96 has connected thereto a piston rod 102 at one end of which is connected to the housing of the steering valve 26. The piston rod 102 extends entirely through the control cylinder 94 for area-balancing purposes and has a free or floating end which extends into the quill 100 at all times.

The control lines 86 and 88 are connected to the head 98 in communication with ports 104 and 106. The port 106 communicates directly with the interior of the control cylinder 94 on one side of the control piston 96. The port 104 communicates with an annulus 108 between the control cylinder 94 and a tubular housing 110 which is spaced radially outwardly from and encloses the control cylinder. The other end of the annulus 108 communicates, through a port 112, with the control cylinder 94 on the other side of the control piston 96.

With the foregoing construction, when fluid under pressure is delivered to the control motor 92 through the control line 86, as shown in FIG. 4, the steering-valve link 90 is contracted. Conversely, when fluid under pressure is delivered through the control line 88, as shown in FIG. 3, the link 90 is extended. As in the embodiment illustrated in FIG. 1 of the drawings and described earlier herein, such contraction or extension of the steering-valve link 90 results in steering of the vehicle in one direction or the other and concurrently develops in the link a longitudinal tension or compression force which is applied to the steerable means.

In the embodiment described previously, the steerable means 14 remains in whatever position it is placed. In the present embodiment, the steering-valve link 90 incorporates means for returning the control piston 96 to an intermediate, neutral position relative to the control cylinder 94, such neutral position corresponding to a straight-ahead position of the steerable means 14. This occurs when no manual steering input force is applied, fluid being bypassed from one end of the control cylinder 94 to the other, through the open center control valve 76, until the control piston 96 reaches its neutral position.

Considering the foregoing means in more detail, it comprises coiled compression spring means 120 telescoped over the tubular housing 110 and having an outer tubular housing 122 telescoped thereover and connected at one end to the steering valve 26. The ends of the spring means 120 are seated against rings 124 and 126 in the annulus between the inner and outer housings 110 and 122. As will be apparent, the rings 124 and 126 are axially slidable on the inner housing 110 and the outer housing 122 is axially slidable on the rings.

The inner and outer housings 110 and 122 respectively carry annular stops 128 and 130 engageable by the ring 124. Similarly, the inner and outer housings 110 and 122 carry annular stops 132 and 134 engageable by the ring 126.

The spring means or spring 120 is initially preloaded in compression so that it biases the various parts toward the positions shown in FIG. 2, wherein the ring 124 is seated on the stops 128 and 130 and the ring 126 is seated on the stops 132 and 134. This corresponds to the neutral position of the control piston 96 relative to the control cylinder 94. More particularly, the relative positions of FIG. 2 correspond to the lack of a manual steering input force, and to a straight-ahead position for the steerable means 14.

If, as the result of a manual steering input force, fluid under pressure is delivered through the control line 86, the steering-valve link 60 is contracted, as shown in FIG. 4, so that the spring 120 is compressed between the stops 128 and 134. Conversely, if fluid under pressure is delivered through the control line 88 to extend the link 90, the spring 120 is compressed between the stops 130 and 132. In either case, upon termination of the manual steering input force, the compressed spring 120 restores the various parts to the relative positions of FIG. 2, fluid being displaced from one side of the control piston 96 to the other as required through the open center control valve 76. At the same time, the steering valves 26 and 28 are caused to restore the steerable means 14 to a straight-ahead position. Thus, the embodiment of FIGS. 2 to 4 of the drawings provides a means for automatically centering the steerable means 14 upon termination of a previously applied manual steering input force.

DESCRIPTION OF EXEMPLARY EMBODIMENT OF INVENTION, FIG. 5

In this figure of the drawings is shown a dual power steering system 140 which includes many of the elements of the system 10. Consequently, such elements are identified by the same reference numerals as are used in FIG. 1 of the drawings.

In this embodiment of the invention, the steering valves 26 and 28 are aligned and interconnected by an intervening rigid connection 142 to form an elongated steering-valve link 144 generally similar to the steering-valve links 60 and 90. As in the preceding embodiments, the steering valve 28 is connected, through its ball stud 56, to the steerable means 14.

However, the ball stud 54 of the steering valve 26 at the opposite end of the steering-valve link 144 is connected, in this embodiment to a pitman arm 146 operable by a steering wheel 148 through a steering gearbox 150.

As will be apparent, turning the steering wheel 148 in one direction or the other causes the pitman arm 146 to tend to move the steering-valve link 144 longitudinally thereof in one direction or the other, thereby developing in the link a longitudinal compression or tension force tending to displace the steerable means 14 in one direction or the other correspondingly. This action of the pitman arm 146 on the link 144 causes the steering valves 26 and 28 to deliver fluid under pressure to the steering motors 22 and 24 as required to displace the steerable means 14 in the direction determined by the manual steering input force applied to the steering wheel 148.

DESCRIPTION OF EXEMPLARY EMBODIMENT OF INVENTION, FIGS. 6 and 7

These figures of the drawings show, fragmentarily, the steering system 10 of FIG. 1 with an alternative steering-valve link 160 differing from the link 60 in that the two steering valves 26 and 28 are at one end of the link and a control motor 162 is at the other end thereof, in alignment with the steering valves.

As in FIG. 1, the ball stud 54 is anchored to the frame 12 and engages the movable valve element 164 of the steering valve 26. The housing 166 of the steering valve 26 is connected to the movable valve element 168 of the steering valve 28 by a suitable connection 170.

The cylinder 172 of the control motor 162 is connected to the housing 174 of the steering valve 28. The cylinder 172, which has the control lines 86 and 88 connected thereto, contains a control piston 176 on a piston rod 178 projecting from the end of the cylinder 172 opposite the steering valve 26. The piston rod 178 has connected thereto a stud 180 which is connected to the steerable means 14 in the same way as the ball stud 56.

The operation of the steering-valve link 160 is essentially the same as that of the link 60. The main advantage of the link 160 is that the valve housings 166 and 174 and the cylinder 172 are all substantially stationary in operation since they are all at the fixed end of the link. Consequently, there is very little flexing of the various hydraulic lines 30, 30, 32, 32, 34, 36, 42, 44, 86 and 88 in operation, which is an important feature.

Although exemplary embodiments of the invention have been disclosed herein for purposes of illustration, it will be understood that various changes, modifications and substitutions may be incorporated in such embodiments and that the invention may be incorporated in other embodiments

I claim as my invention:

1. In a dual, fluid operated, power steering system for a vehicle having a frame and steerable means, the combination of:
   a. two fluid operated steering motors connected to said steerable means;
   b. two steering valves respectively connected to and controlling said steering motors;
   c. two steering pumps respectively connected to and supplying fluid under pressure to said steering valves;
   d. a control motor, comprising a control cylinder and a control piston, aligned with said steering valves and forming therewith an elongated variable-length steering-valve link constituting means for actuating said steering valves;
   e. manually operable means for delivering fluid underpressure to said control cylinder on opposite sides of said control piston selectively to vary the length of said steering-valve link and thus actuate said steering valves selectively; and
   f. means connecting the ends of said steering-valve link to said steerable means and said frame, respectively.

2. A dual power steering system as set forth in claim 1 wherein said steering-valve link has said steering valves at its ends and said control motor in the middle.

3. A dual power steering system according to claim 1 wherein said steering-valve link has said steering valves at one end and said control motor at the other.

4. A dual power steering system as defined in claim 1 including spring means interconnecting said control cylinder and said control piston for biasing said control piston toward an intermediate position relative to said control cylinder.

5. A dual power steering system as set forth in claim 1 wherein said control means includes a control pump and a control valve for connecting said control pump to said control cylinder on opposite sides of said control piston selectively.

6. A dual power steering system according to claim 5 wherein said control valve is fluid operated and wherein said control means includes manually operable pump means for operating said control valve.

7. In a dual, fluid operated, power steering system for a vehicle having a frame and steerable means, the combination of:
   a. two fluid operated steering motors connected to said steerable means;
   b. two steering valves respectively connected to and controlling said steering motors;
   c. said steering valves being aligned and forming parts of an elongated steering-valve link and being actuable in response to the development of a longitudinal force in said steering-valve link;
   d. two steering pumps respectively connected to and supplying fluid under pressure to said steering valves;
   e. means connecting one end of said steering-valve link to said steerable means so as to apply to said steerable means any longitudinal force developed in said steering-valve link; and
   f. manually operable means acting on said steering-vlave link for developing a longitudinal force in said steering-valve link so as to actuate said steering valves.

8. A dual power steering system as defined in claim 7 wherein said manually operable means includes a pitman arm connected to the other end of said steering-valve link.

9. A dual power steering system according to claim 7 wherein:
   a. the other end of said steering-valve link is connected to said frame;
   b. said steering-valve link includes extensible and contractable means; and
   c. said manually operable means includes means for extending and contracting said extensible and contractable means so as to develop a longitudinal force in said steering-valve link to actuate said steering valves.

10. A dual power steering system as set forth in claim 9 wherein said extensible and contractable means is between said steering valves.

11. A dual power steering system according to claim 9 wherein said extensible and contractable means forms one end of said steering-valve link.

PO-1050
(5/69)

UNITED STATES PATENT OFFICE
CERTIFICATE OF CORRECTION

Patent No. 3,602,326          Dated August 31, 1971

Inventor(s) Robert A. Garrison

It is certified that error appears in the above-identified patent and that said Letters Patent are hereby corrected as shown below:

Column 1, line 7 "No." should be --system--;

Column 1, line 18 "on" after valve should be --in--;

Column 1, line 49, after "dual" insert --power--;

Column 1, line 75, "a" should be --the--;

Column 2, line 59, "26" should be --16 may--;

Column 3, line 71, after "102" delete "at";

Column 5, line 17 "gearbox" should be --gear box--;

Column 6, line 7, after "operable" insert --control--;

Column 6, line 7, "underpressure" should be --under pressure--;

Column 6, line 49 "steering-vlave" should be --steering-valve--.

Signed and sealed this 11th day of April 1972.

(SEAL)
Attest:

EDWARD M. FLETCHER, JR.
Attesting Officer

ROBERT GOTTSCHALK
Commissioner of Patents